United States Patent [19]

Renner

[11] Patent Number: 4,466,093
[45] Date of Patent: Aug. 14, 1984

[54] TIME SHARED CONFERENCE ARRANGEMENT

[75] Inventor: Robert E. Renner, Glendale, Ariz.

[73] Assignee: GTE Automatic Electric Inc., Northlake, Ill.

[21] Appl. No.: 453,266

[22] Filed: Dec. 27, 1982

[51] Int. Cl.³ ............................................... H04J 3/02
[52] U.S. Cl. .................................. 370/62; 179/18 BC
[58] Field of Search ...................... 370/62; 179/18 BC

[56] References Cited

U.S. PATENT DOCUMENTS

| | | | |
|---|---|---|---|
| 4,126,766 | 11/1978 | McLaughlin et al. | 179/18 BC |
| 4,175,215 | 11/1979 | McLaughlin et al. | 370/62 |
| 4,257,120 | 3/1981 | Funderburk et al. | 370/62 |
| 4,274,155 | 6/1981 | Funderburk et al. | 370/62 |
| 4,301,531 | 11/1981 | Lubin | 370/62 |
| 4,387,457 | 6/1983 | Münter | 370/62 |

*Primary Examiner*—Douglas W. Olms
*Assistant Examiner*—Kenneth I. Rokoff
*Attorney, Agent, or Firm*—Frank J. Bogacz; Peter Xiarhos

[57] ABSTRACT

The conference circuit provides for establishing a conference call between three conferees in a T-S-T digital switching network. The voice samples of the three conferees are sequentially stored in input buffers. When all three conferees' samples are stored, the samples are transferred to working buffers, while the input buffers store three other conferees' samples. In the time slot succeeding the transfer to the working buffers, two conferees' voice samples are compared. During the next time slot, the resultant of the comparison is transmitted to the third conferee. This conference arrangement provides for time sharing up to 64 three-port conference calls via the switching network.

18 Claims, 7 Drawing Figures

TIME SHARED CONFERENCE ARRANGEMENT

CROSS-REFERENCE TO RELATED APPLICATIONS

The present application is related to copending U.S. patent applications Ser. No. 453267 and 453268, having the same inventive entity and being assigned to the same assignee.

BACKGROUND OF THE INVENTION

The present invention generally pertains to a conference calling arrangement for a digital switching network and more particularly to a time shared three-port conference circuit for use in conjunction with a T-S-T digital switching network.

Historically, switching systems were equipped with a number of conference circuits. When a request for a conference call is detected by such a switching system, this system would select an unused conference circuit to connect each of the conferees in a conference call arrangement. In this scheme, one conference call would require one conference circuit.

With the advent of time division switching systems, conference circuits are required to manipulate PCM voice samples in an associated time slot switching environment. Time division switching systems utilize common equipment for a number of subscribers. One conference circuit for each conference call is inefficient.

One such conference circuit for manipulating PCM voice samples is taught by U.S. Pat. No. 4,126,766, issued on Nov. 21, 1978, and having the same successor in interest as the assignee of the present application. This conference circuit is a three-port device for use in a private automatic branch exchange. This conference circuit handles only a single conference call at a time. Each conference call requires a separate conference circuit. Threshold level detection and last speaker retention features are provided by this circuit In addition, all three conferees' voice samples are compared before outputting the resultant loudest speakers' samples.

Another digital multiport conference circuit is taught by U.S. Pat. No. 4,175,215, issued on Nov. 20, 1979, and having the same successor in interest as the assignee of the present application. This circuit provides for handling a single conference call at a time. In addition, threshold level detection and last speaker retention features are provided.

Another multiport conference circuit is taught by U.S. Pat. No. 4,274,155, issued on June 16, 1981, and having the same successor in interest as the assignee of the present application. Similar to the above mentioned circuits, this circuit also handles one conference call at a time.

Each of the above mentioned circuits suffers from the same deficiency of operating in a time shared switching system, while not itself being a time shared circuit.

Accordingly, it is the object of the present invention to provide an efficient time shared conference circuit for use with a digital time division switching system.

SUMMARY OF THE INVENTION

A Time-Space-Time switching system includes a plurality of switching system subscribers. Three subscribers of this plurality: a first, a second and a third may be connected in a time shared conference arrangement. The switching system has a time-space-time digital switching network which is connected to each of the subscribers. The switching network operates to connect the three subscribers in a conference call by transferring PCM voice data samples of the subscribers in three consecutive time slots.

The conference arrangement includes a timing generator, which is connected to the switching network and operates to generate a plurality of periodic pulses. A first buffer is connected to the timing generator and to the switching network. This buffer operates to sequentially store the voice data of the three consecutive switching network time slots. This voice data are the PCM samples of the three subscribers in the conference call.

During a successive time slot, a second buffer, which is connected to the timing generator and to the first buffer, simultaneously stores all three of the voice data samples. At the same time, the first buffer stores a voice data sample for one particular subscriber of a second conference call.

First gating logic is connected to the second buffer and to the timing generator and is operated to transmit two voice data samples of the stored ones, during each time slot. First comparing logic is connected to the first gating logic and determines which of the two transmitted voice data samples is greater in magnitude. Second comparing logic is connected to the first gating logic and is operated to determine whether the two transmitted voice data samples are greater in magnitude than a predefined threshold level.

Second gating logic is connected to the second comparing logic. This gating logic determines whether at least one of the two transmitted voice data samples is greater in magnitude than the threshold level. Third gating logic is connected to the second gating logic and to the first comparing logic. The third gating logic operates to produce a signal for selecting the voice data sample of greater magnitude, which is also greater than the threshold level. In addition, the third gating logic generates another signal indicating that neither voice sample is above the threshold limit.

As a result, a memory arrangement, which is connected to the timing generator and to the third gating logic, operates to transmit the identity of which voice sample in the identical time slot of the preceding time frame was greater in magnitude. At the same time, the memory arrangement stores an indication of the voice sample of the greater magnitude. This indication may be used in the next successive time frame. If neither voice sample was above the threshold limit, the third gating logic will operate to transmit the voice sample of the present time slot which is identical to the voice sample of the previous time slot with a greater magnitude.

During a next successive time slot, a multiplexing arrangement, which is connected to the second buffer through the first gating logic and is connected to the third gating logic, operates to transmit the selected voice sample of greater magnitude to the switching network. Simultaneously, during this time slot, the first buffer operates to store a voice data sample of a second subscriber of a second conference call.

DESCRIPTION OF THE PREFERRED EMBODIMENT

Figure 1:
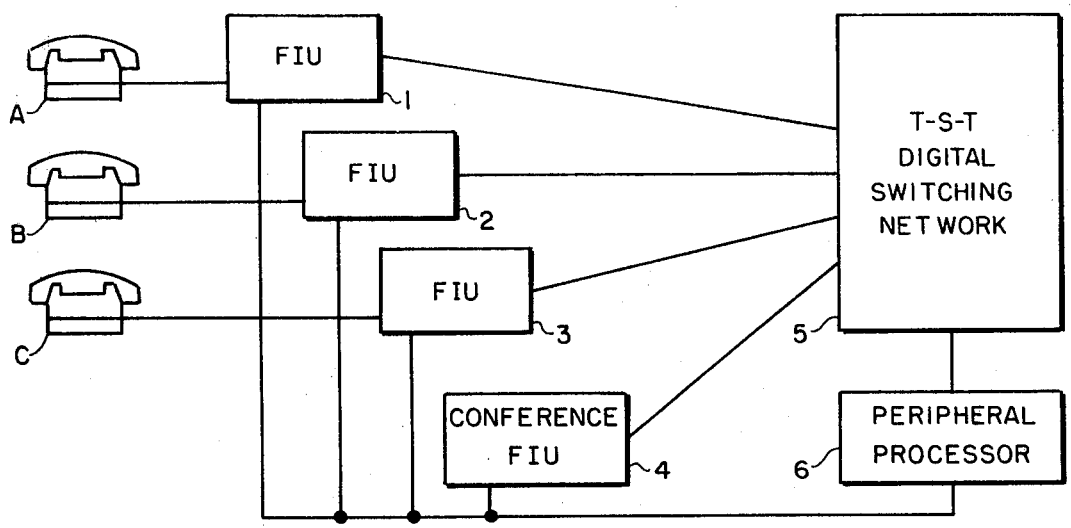
FIG. 1 is a block diagram of a conference call arrangement in a digital switching system in accordance with the principles of operation of the present invention.

Referring to FIG. 1, telephone subscribers A, B and C are respectively connected to Facility Interface Units (FIUs) 1, 2 and 3. Telephone subscriber A has the ability to initiate a conference call arrangement between himself and other subscribers. This means that all three subscribers may talk and hear the other subscribers simultaneously. Upon the initiation of a request of subscriber A, a connection will be established through FIU 1, to digital switching network 5.

Digital switching network 5, which is connected to peripheral processor (PP) 6, will establish connection to conference facility interface unit 4. Telephone subscriber A, then selects the number of telephone subscribers B and C. As a result, digital switching network 5 establishes a connection to subscriber B through FIU 2 and a connection to subscriber C through FIU 3. Voice samples of each of the telephone subscribers A, B and C are time switched by the digital switching network 5 to conference FIU 4 in sequential order. Peripheral processor 6 is connected to each of the FIUs 1 through 4. Peripheral processor 6 controls the operation of each of the FIUs for switching voice samples.

Each FIU 1-3 may have a number of subscribers (not shown) with the ability to initiate conference calls. The switching network 5 orders the conferees of each conference call in consecutive time slots for use by the conference FIU 4. For example, the switching network 5 sequentially orders the PCM voice samples of subscribers A, B and C in three consecutive time slots for use by the conference FIU 4.

A switching office may contain many FIUs and conference FIUs. A particular conference FIU may connect up to 64 independent conference calls, each conference call includes three subscribers in conversation.

Figure 2:
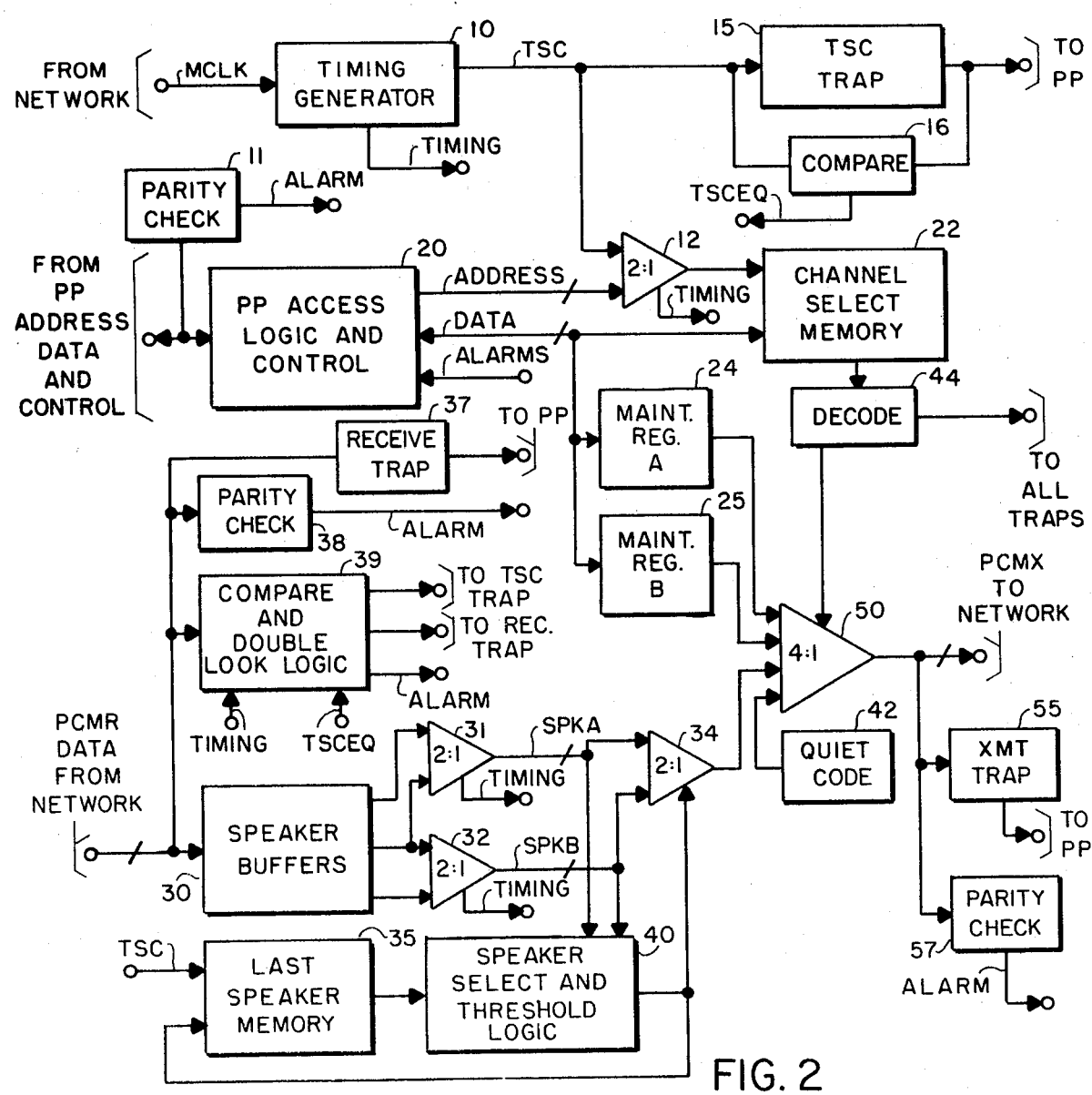
FIG. 2 is a block diagram of the time shared conference facility interface unit of FIG. 1.

FIG. 2 is a block diagram of the conference FIU shown in FIG. 1. The conference FIU is a three-port device. Each of the three ports includes three consecutive input time slots and three consecutive output time slots having a fixed relationship between them. PCM voice samples from the digital switching network are input into speaker buffers 30 of the conference FIU 4 of FIG. 1. Speaker buffers 30 include three twelve-bit input buffers and three twelve-bit working buffers. Voice samples of the three conferees of a conference call are sequentially stored in one of the three input buffers. When each of the input buffers has a PCM voice sample, their data is simultaneously transferred to the working buffers while three other conferees' PCM voice samples are collected by the input buffers.

This arrangement permits the conference FIU to be time shared among a number of conference calls (up to 64). The conference FIU logic performs one comparison for each time slot of 648 nanoseconds. During one time slot, the conference FIU compares the voice levels of the conferees of the conference call, with the loudest conferee being the one to prevail in the conference. In addition, the conference FIU detects basic threshold levels of the speakers and defaults to retaining the conferee who was the speaker in the preceeding time frame for the conference call, if no conferee is above the threshold level. The conference FIU outputs a PCM voice sample in the next time slot after these comparisons are made. The following table depicts the time slot performance of the conference FIU.

TABLE

| Time Slot | PCM Input Sample (PCMR) | Comparison Made | PCM Output Sample (PCMX) |
|---|---|---|---|
| 0 | A | | |
| 1 | B | | |
| 2 | C | | |
| 3 | D | B-C | |
| 4 | E | A-C | B or C to A |
| 5 | F | A-B | A or C to B |
| 6 | G | E-F | A or B to C |
| 7 | H | D-F | E or F to D |
| 8 | I | D-E | D or F to E |
| 9 | | H-I | D or E to F |
| 10 | | G-I | H or I to G |
| 11 | | G-H | G or I to H |
| 12 | | | G or H to I |

Before PCM samples are received by speaker buffers 30, the samples are examined by parity check 38 for proper parity. Improper parity will result in an alarm being output and in the operation of TSC trap 15, receive trap 37 and transmit trap 55. In addition, the sample will be processed by the remainder of the circuitry Receive trap 37 may be selectively operated to remove any particular PCM voice sample from the input stream and return it to the peripheral processor 6. After buffering by speaker buffers 30 as mentioned above, two PCM voice samples are transmitted through multiplexers 31 and 32, respectively, to speaker select and threshold logic 40 via the SPKA and SPKB buses. During each time slot, the voice samples of two conferees are compared.

PCM voice samples consist of twelve bits of data. Eight bits of data represent the voice sample of the speaker. Of these eight bits, seven bit represent the magnitude and one bit represents the sign. Three bits of the PCM voice sample are supervisory bits having various uses by the network. The remaining bit of each PCM sample is the parity bit.

Speaker select and threshold logic 40 compares the seven magnitude bits of the two PCM voice samples input to it. This comparison detects the louder of the two conferees. Each PCM voice sample is also tested against a predefined minimum threshold level (a binary "1001" in the most significant bits of the seven-bit magnitude.) If either or both conferees' voice sample is greater than the threshold level, the result of this comparison will be output during this time slot. That is, the louder conferee's voice sample will be the one output to the remaining conferee. If however, both conferees' PCM voice samples are less in magnitude than the threshold level, the resultant output to the other conferee will be the PCM voice sample having the greater magnitude of the same time slot of the previous PCM time frame.

The identity of the louder speaker will be stored in last speaker memory 35, as a function of the time slot counter, to be used during the next time frame, if needed. As a result, the PCM voice sample of the SPKA or SPKB bus is enabled through multiplexer 34 and through multiplexer 50, where the PCMX signal is transmitted back to the network 5 for switching An examination for proper parity is made by parity check 57. Invalid parity results in activation of traps 15, 37 and 55. In addition, the PCMX data may be captured by transmit trap 55 for examination by peripheral processor 6. In addition, the PCMX data will be transmitted to the network for switching.

The network 5 is connected to timing generator 10 via the MCLK bus for providing synchronization between the network 5 and the conference FIU 4. The timing generator 10 counts from 0 to 192 at a rate of one count per 648 nanoseconds. This provides the basic time slot operation for the conference FIU 4 synchronously with network 5. An eight phase clock is also generated by the timing generator 10. In addition, the timing generator 10 provides a divide by three counter to control the storage of voice samples in speaker buffers 30. Timing generator 10 is also connected to TSC trap 15 via the TSC (time slot counter) lead.

The TSC trap 15 is connected to the peripheral processor and operates to capture and transmit the value of the time slot counter to the peripheral processor. If an error is detected, compare logic 16 transmits the value of the TSC which was trapped to compare and double look logic 39. During the next succeeding time frame, another comparison is performed by double look logic 39. A second consecutive error in the same time slot will result in an alarm being output by double look logic 39.

PP access logic and control 20 is connected to the peripheral processor 6 and receives both address and data via corresponding buses. These buses are examined by parity check 11 with an alarm resulting for detection of any parity errors. A parity error will result in an address or data parity failure indication being returned to the peripheral processor.

Channel select memory 22 is connected to multiplexer 12. The TSC lead connects timing generator 10 to multiplexer 12. The address bus connects PP access logic 20 to multiplexer 12. The channel select memory 22 provides for storing control information for operating traps 15, 37 and 55 and controlling the output of multiplexer 50.

Maintenance register A 24 and maintenance register B 25 are connected to PP access logic 20 via the data lead. The peripheral processor 6 has the capability to load maintenance register A 24 or maintenance register B 25 with data to insert into the PCM voice data stream output by the conference FIU. Channel select memory 22 stores the instructions and time slots in which maintenance data, stored in maintenance registers A 24 and B 25, is to be inserted into the output PCM voice data stream. The stored instructions are decoded by decode circuit 44. In addition, channel select memory 22 contains coded instructions for enabling decode logic 44 to select the trapping of any PCM data by receive trap 37, TSC trap 15, or transmit trap 55.

Multiplexer 50 provides for transmitting the resultant voice samples of speaker select and threshold logic 40, the contents of maintenance register A 24, the contents of maintenance register B 25, or quiet code from quiet code circuitry 42. It is to be noted that the binary value of the minimum magnitude of a PCM voice sample is seven bits of logic "1" and the maximum magnitude being seven bits of logic "0." Therefore, quiet code circuitry 42 generates seven bits of logic "1."

TSC trap 15 may be operated via stored instructions in the channel select memory 22. These instructions are decoded by decode circuit 44. In addition, a PCM receive data miscompare between this conference FIU and a duplicate copy will cause compare and double look logic 39 to operate the traps, as mentioned above.

Receive trap 37 may be operated via stored instructions in channel select memory 22, which are decoded by decode circuit 44 to trap any particular voice sample. Other internal receive conditions may cause receive trap 37 to operate. Transmit trap 55 may also be operated via these stored instructions by decode circuit 44 to trap any particular voice sample.

Figure 3:
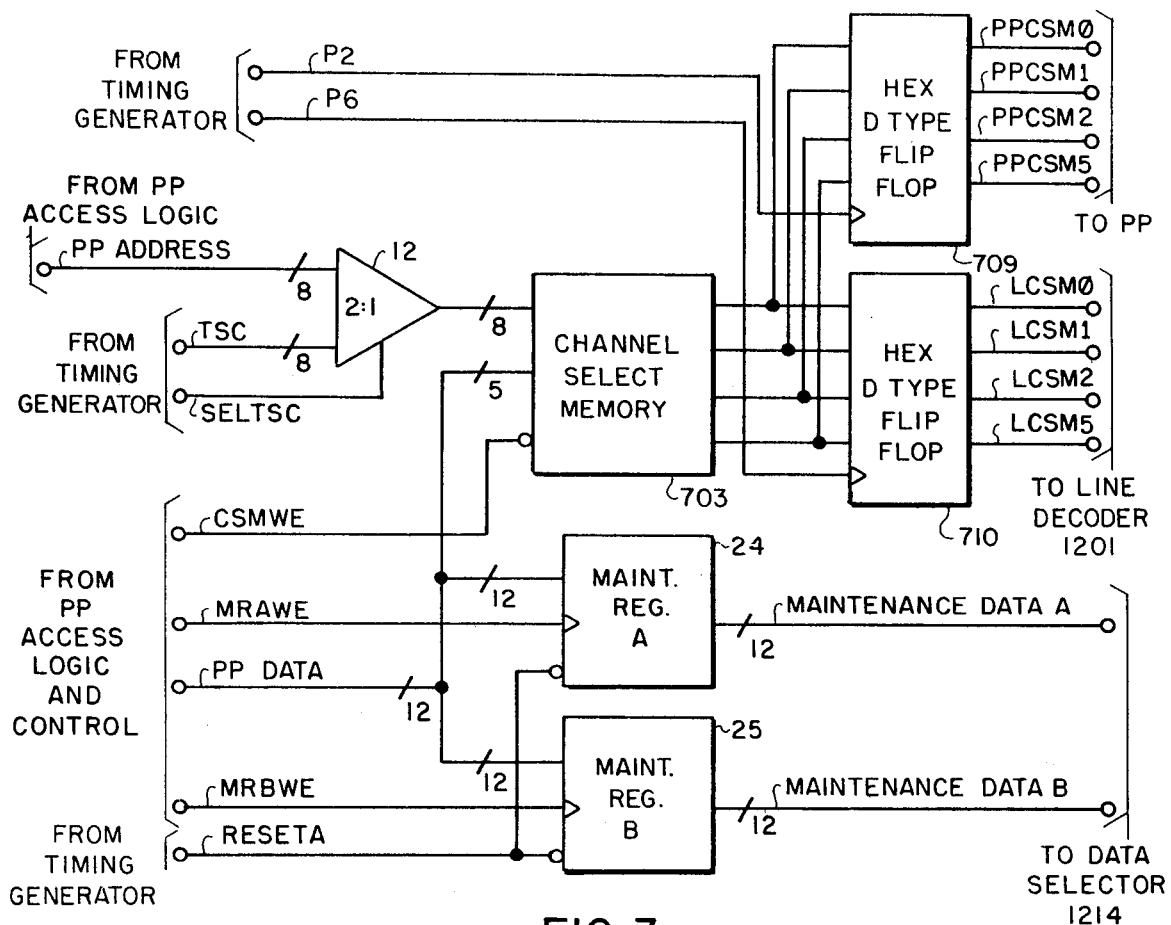
FIG. 3 is a schematic diagram of a maintenance data insertion arrangement.

FIG. 3 is a schematic diagram of multiplexer 12, channel select memory 22, maintenance register A 24, maintenance register B 25, and decode circuit 44 as shown in FIG. 2. PP access logic 20 of FIG. 2 is connected via eight-bit PP address bus to multiplexer 12 as shown in FIG. 3. Another eight-bit bus is connected from timing generator to multiplexer 12. This bus is the time slot counter bus. The timing generator is also connected to multiplexer 12 via the SELTSC and enables either the values of the TSC bus or the PP address bus to be transmitted through multiplexer 12 to be stored in channel select memory 703. Channel select memory 703 is connected to multiplexer 12 via an eight-bit bus. In addition, a signal on lead CSMWE controls writing the channel select memory 703. The data to be written in the channel select memory 703 is transmitted via the PP data bus, a twelve-bit bus. The five low order bits of the PP data bus are transmitted to channel select memory 703 to select storage locations.

Maintenance register A 24 and maintenance register B 25 are each connected via twelve-bit PP data bus to PP access logic and control 20. PP access logic 20 selectively enables maintenance register A 24 or maintenance register B 25 via the MRAWE and MRBWE leads, respectively. The timing generator 10 provides for resetting each of the maintenance registers via the RESETA lead.

Twelve-bit PCM data samples are stored in maintenance register A 24 and maintenance register B 25 to be inserted into the PCM voice stream by the peripheral processor 6 for network diagnositc purposes. Channel select memory 703 is connected to HEX D-type flip-flops 709 and 710. These flip-flops are selectively enabled by timing signals P2 and P6 from the timing generator. The four outputs of flip-flop 709 are read control signals for use when the PP reads data from channel select memory 22. The outputs of flip-flops 710 control the gating of the multiplexer 50 of FIG. 1 and enable traps 15, 37 and 55 to operate.

Figure 4:
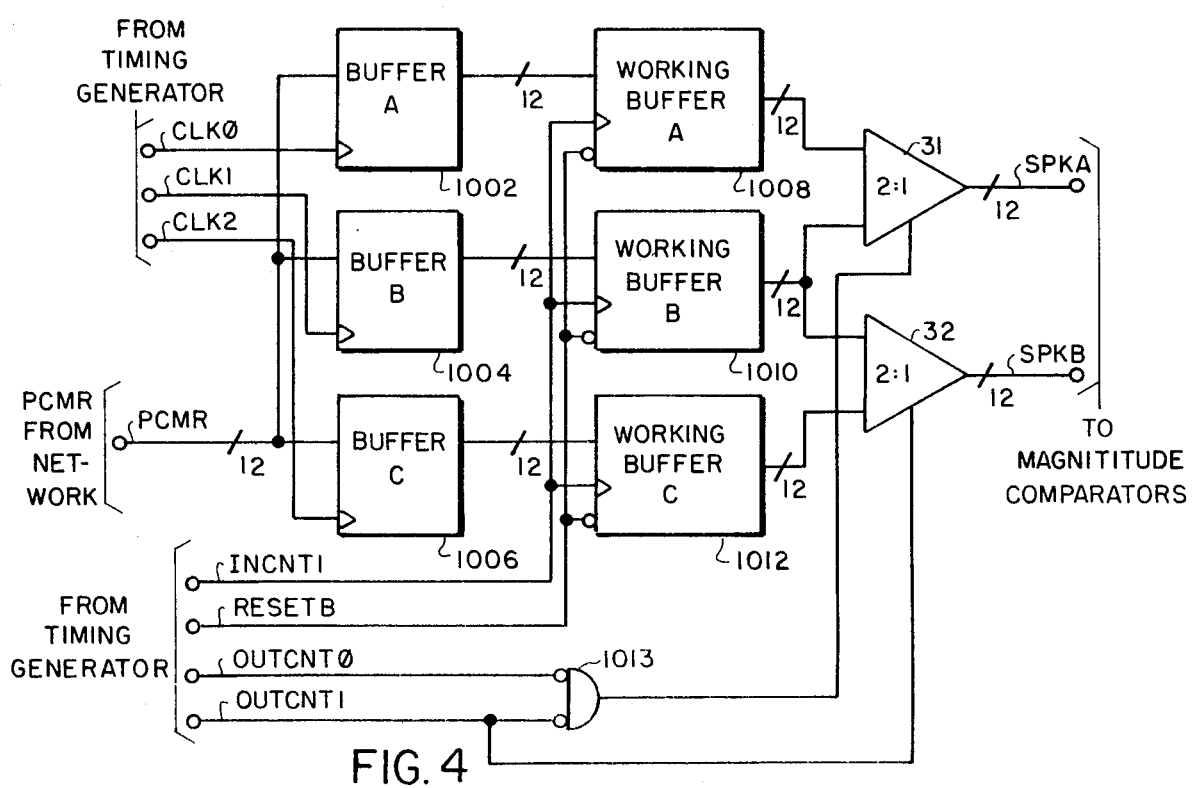
FIG. 4 is a schematic diagram of the time shared speaker buffer arrangement of the present invention.

FIG. 4 depicts a schematic diagram of speaker buffers 30 of FIG. 2. Buffer A 1002 stores the first PCM voice sample from network 5. Buffer B 1004 and buffer C 1006 store the second and third speakers' voice samples, respectively, transmitted in the next two time slots of the particular frame.

When all three buffers have been clocked by their various clock signals, the INCNT 1 signal causes the contents of each of the buffers to be shifted to a corresponding working buffer. That is, contents of buffer A 1002 are transferred to working buffer A 1008; the contents of buffer B 1004 are transferred to working buffer B 1010; and the contents of buffer C 1006 are transferred to working buffer C 1002. Working buffer A 1008 is connected to multiplexer 31. Working buffer C 1012 is connected to multiplexer 32. Working buffer B 1010 is connected to both multiplexers 31 and 32. Gate 1013 provides for selectively enabling multiplexer 31 or 32 in response to signals from the timing generator to transmit the appropriate two speaker samples per time slot for speaker selection and threshold determination. Refer to the above table for selection sequence.

Figure 5:
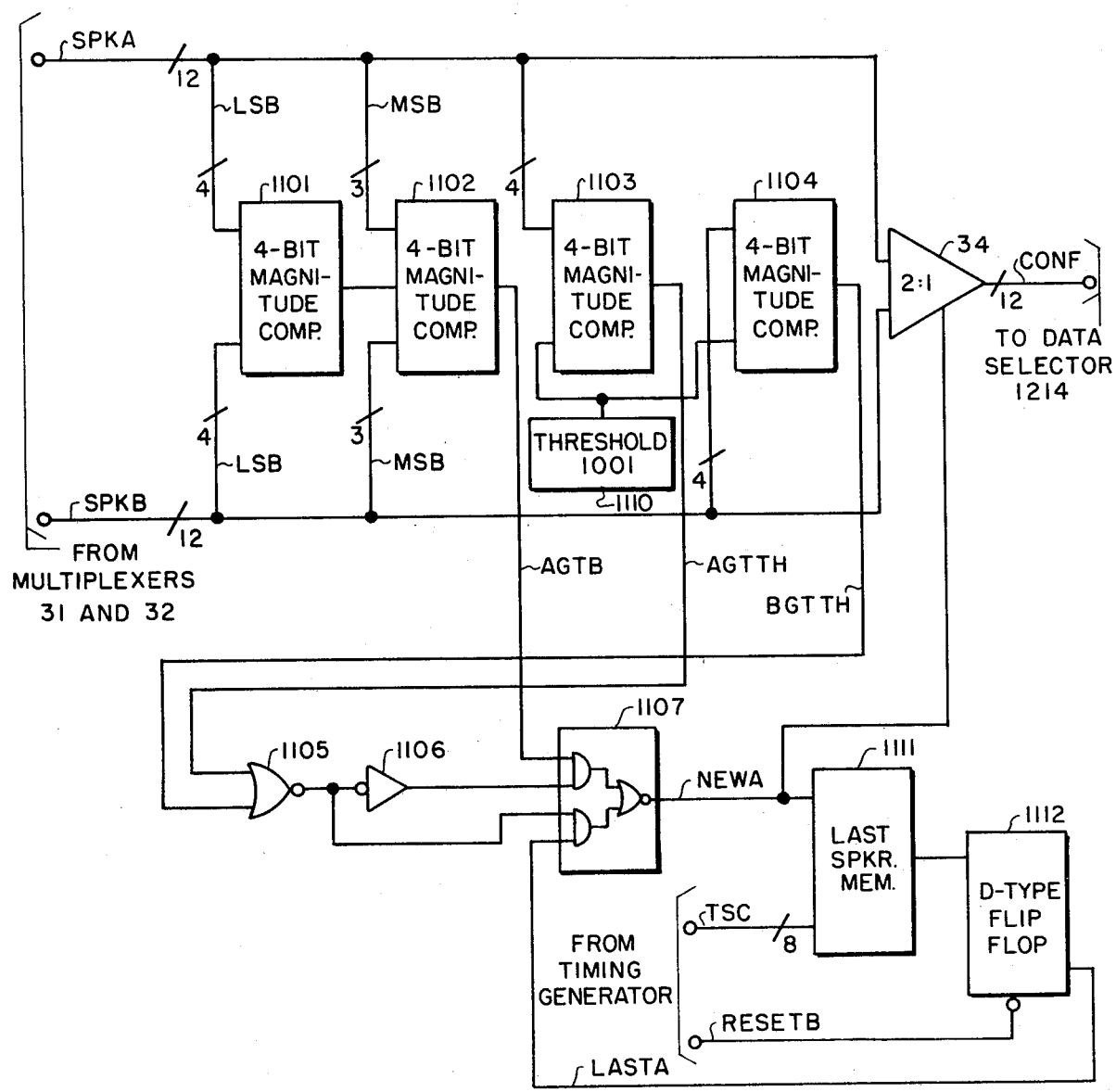
FIG. 5 is a schematic diagram of the time shared threshold level detection and last speaker retention logic.

FIG. 5 depicts the speaker magnitude comparison and threshold level detection circuitry as shown by item 40 of FIG. 2. The SPKA bus and SPKB bus represent the output of multiplexers 31 and 32, respectively. The four least significant bits of each bus, SPKA and SPKB, are connected to four-bit magnitude comparator 1101. The three most significant bits of each bus are connected to four-bit magnitude comparator 1102.

Magnitude comparator 1101 is connected to comparator 1102 via a three-bit bus so that the results of seven bits may be analyzed in total. Comparator 1102 produces a signal on the AGTB lead. This signal indicates that voice sample of the SPKA bus is louder than voice sample of the SPKB bus. This signal has a value logic "1," if conferee A is louder than B. Otherwise, the AGTB lead has a value of logic "0." Comparator 1102 is connected to gating arrangement 1107.

Next, the magnitude of the SPKA bus and SPKB bus is compared against a predefined minimum threshold level. Comparator 1103 examines the PCM voice sample of the SPKA bus against the threshold level and comparator 1104 examines the voice sample of the SPKB bus against the threshold level. These comparators work with the four most significant bits of each PCM voice sample. The predefined minimum threshold level of a voice sample is set equal to the binary value of "1001" for the most significant four bits by threshold logic 1110. This threshold level may be set at various binary values with +5 volts being logic "1" and ground being logic "0." If either speaker voice sample is greater than the threshold, gates 1105 and 1106 will allow multiplexer 34 to gate out the PCM voice sample of SPKA bus or SPKB bus, whichever is larger in magnitude.

If both speakers are less than the threshold level, gate 1107 will enable multiplexer 34 to gate out the present voice sample of the louder speaker, during the same time slot of the previous time frame. In addition, the identity of the louder conferee of the present time slot will be stored into last speaker memory 1111, via a signal on the NEWA lead, as a function of the appropriate time slot counter. This identity could be used in the same time slot of the next frame. Flip-flop 1112 operates to latch the value of the last speaker for each particular time slot and transmits this to gate 1107.

Figure 6:
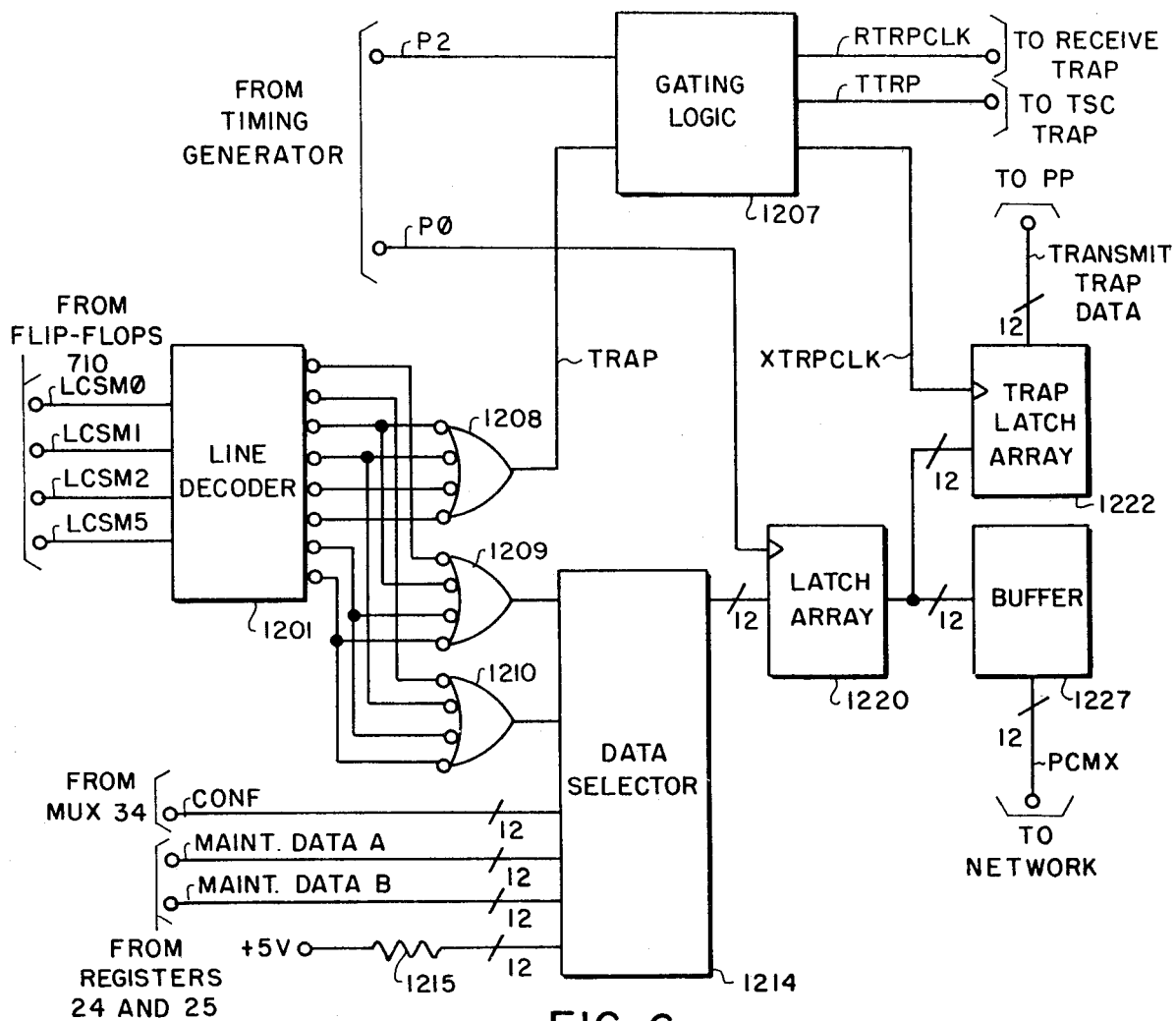
FIG. 6 is a schematic diagram of the output control logic and a portion of the data capture logic of the conference facility interface unit.

FIG. 6 is a schematic diagram of the PCM transmission section of the conference FIU. The PCM voice sample resultant from the speaker select and threshold logic is transmitted via the CONF bus to data selector 1214. In addition, twelve-bit buses maintenance data A and maintenance data B are connected between the data selector 1214 and registers 24 and 25 for transmitting the contents of maintenance register A 24 and maintenance register B 25, respectively, into the PCMX data stream to the network. In addition, a +5 volt source is connected through resistor 1215 to data selector 1214 and provides for the generation of the quiet code.

Data selector 1214 receives enabling signals from flip-flops 710 via line decoder 1201 and gates 1209 and 1210. Decoder 1201 is connected to AND gates 1208, 1209 and 1210. Gate 1209 provides an output for selecting maintenance register A 24 to be gated through the data selector 1214. Similarly, gate 1210 provides for selecting maintenance register B 25 through data selector 1214. Gate 1208, which is connected to gating logic 1207, provides for selectively enabling the traps 15, 37 or 55 to operate.

Data selector 1214 normally permits the result of the CONF bus to be transmitted through selector 1214. If no speaker is indicated in the particular time slot, the quiet code supplied through resistor 1215 will be gated out through data selector 1214. The output of data selector 1214 is stored in latch array 1220. Latch array 1220 is connected to buffer 1227 via a twelve-bit bus. Buffer 1227 is connected to the network via the PCMX bus for transmitting the conference PCM sample to the network for switching.

Trap latch array 1222 is also connected to latch array 1220 and operates in response to the trap signal produced by gating logic 1207. The enabling signal to gating logic 1207 is produced by AND gate 1208. Gating logic 1207 combines the enabling signal of gate 1208 with timing signal P2 from the timing generator to produce the XTRPCLK signal to enable the trap latch array 1222 and to produce the TTRP and RTRPCLK signals to enable the other traps. Data collected by the trap latch array 1222 is transmitted to the peripheral processor.

Figure 7:
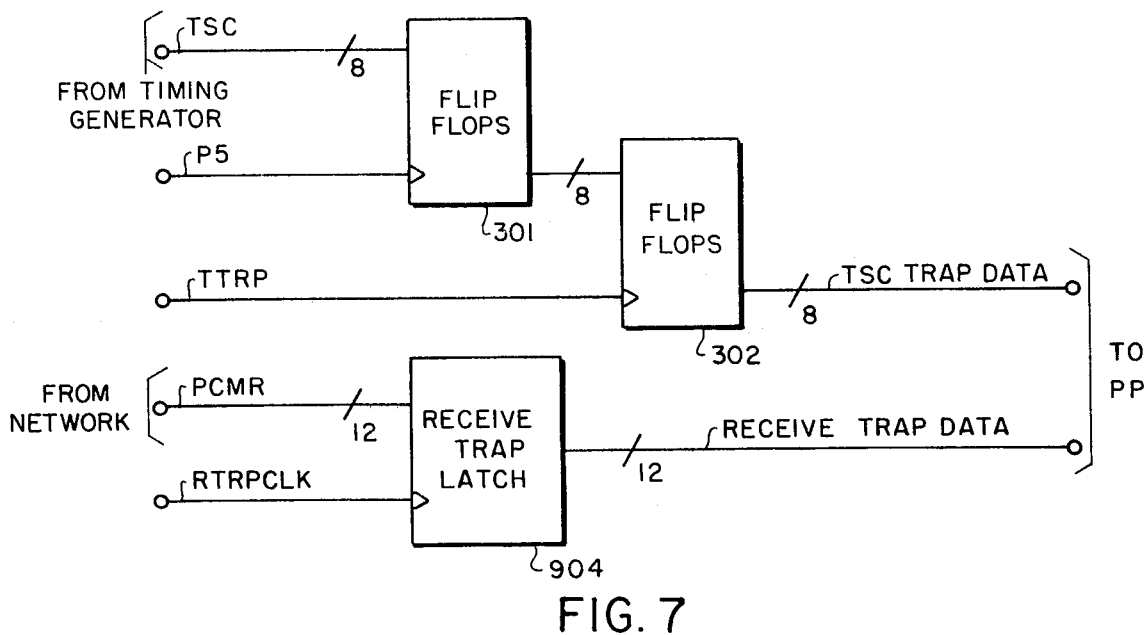
FIG. 7 is a schematic diagram of the remaining portion of the data capture logic.

FIG. 7 depicts the receive trap 37 and the TSC trap 15 of FIG. 2. Receive trap latch 904 is connected to the peripheral processor via the PCMR bus. Receive trap latch 904 operates in response to the RTRPCLK signal of gating logic 1207 to latch the value of the PCM voice sample currently on the PCMR bus. This trapped data may be transmitted to the peripheral processor via the receive trap data bus.

Flip-flops 301 are connected via the TSC bus to the timing generator and latch the value of the TSC bus in response to the P5 signal of the timing generator. When the gating logic 1207 detects a request for a TSC trap the TTRP signal is transmitted to flip-flops 302 from gating logic 1207. Flip-flops 301 are connected to flip-flops 302 and latch the value of the TSC bus. The output of flip-flops 302 may be gated to the peripheral processor via the eight-bit TSC trap data bus.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a Time-Space-Time switching system, a time shared conference arrangement comprising:
   a plurality of switching system subscribers including a first, a second and a third subscriber;
   said switching system having a Time-Space-Time digital switching network connected to each said subscriber and said network being operated to connect said first, second and third subscribers in said conference arrangement by transferring PCM voice data samples of said subscribers in three consecutive time slots;
   timing means connected to said switching network and being operated to generate a plurality of periodic pulses;

first buffering means connected to said timing means and to said switching network, said first buffering means being operated to sequentially store said voice data samples of said three consecutive switching network time slots, said three voice data being PCM samples of said first, said second and said third subscribers, respectively;

said time shared conference arrangement being serially operated during a successive time slot:

second buffering means connected to said timing means and to said first buffering means, said second buffering means being operated to simultaneously store said three voice data samples of said first buffering means;

said first buffering means being further operated to store said voice data sample of a next time slot of said switching network time slots, said voice data of said next time slot being a PCM sample of a first other subscriber in a second conference arrangement;

first gating means connected to said second buffering means and to said timing means, said first gating means being operated to transmit two voice data samples of said stored three voice data samples, during each said successive time slot;

first comparing means connected to said first gating means and being operated to determine which of said two transmitted voice data samples is greater in magnitude;

second comparing means connected to said first gating means and being operated to determine whether said two transmitted voice data samples are greater in magnitude than a predefined threshold level;

second gating means connected to said second comparing means and being operated to determine whether at least one of said two transmitted voice data samples is greater in magnitude than said threshold level, and said second gating means being operated to generate a first signal in response to said determination;

third gating means connected to said second gating means and to said first comparing means, said third gating means being operated to generate a second signal of a first value in response to said first signal for selecting said voice data sample of greater magnitude which is greater in magnitude than said threshold level and said third gating means being operated to generate a second signal of a second value for said two transmitted voice data samples being less in magnitude than said threshold level;

memory means connected to said timing means and to said third gating means, said memory means being operated in response to said second signal of said second value to generate a third signal for indicating which said voice data sample of an identical time slot of the preceeding time frame is greater in magnitude;

said third gating means being further operated in response to said third signal to generate said second signal of said first value;

said memory means being further operated to store said second signal of a first value for use during an identical time slot of a next successive time frame;

said time shared conference arrangement being further serially operated during a next successive time slot:

multiplexing means connected to said second buffering means through said first gating means and connected to said third gating means, said multiplexing means being operated in response to said second signal of said first value to transmit said voice sample of greater magnitude to said switching network; and said first buffering means being simultaneously operated with said multiplexing means to store said voice data sample of a second next time slot of said switching network time slots, said voice data sample being a PCM sample of a second other subscriber in said second conference arrangement.

2. A time shared conference arrangement as claimed in claim 1, said switching system including:

a plurality of interface units, each said interface unit connected between at least one said subscriber and said switching network, each said interface unit being operated to generate and to transfer said PCM voice data samples of said connected subscribers between said switching network and said subscribers in particular time slots; and processor means connected to each of said interface units and to said switching network, said processor means being operated to control said transfer of said voice data samples to said interface units and to said switching network.

3. A time shared conference arrangement as claimed in claim 1, wherein:

said timing means is further operated to cyclically produce three clock signals, a first, a second and a third clock signal, in three consecutive time slots; and said first buffering means including:

a first buffer connected to said timing means and being operated in response to said first clock signal to store a PCM voice data sample of a first time slot;

a second buffer connected to said timing means and being operated in response to said second clock signal to store a PCM voice data sample of a second consecutive time slot; and a third buffer connected to said timing means and being operated in response to said third clock signal to store a PCM voice data sample of a third consecutive time slot.

4. A time shared conference arrangement as claimed in claim 3, wherein each said buffer stores twelve binary digits; eight of said binary digits representing said subscriber's voice sample; three of said binary digits representing network supervision information; and one of said binary digits representing parity information over said voice and supervision information.

5. A time shared conference arrangement as claimed in claim 4, wherein:

said timing means is further operated to cyclically produce an input count signal during every third time slot; and said second buffering means including:

fourth buffer connected to said first buffer and to said timing means;

a fifth buffer connected to said second buffer and to said timing means;

a sixth buffer connected to said third buffer and to said timing means; and said fourth, fifth and sixth buffer simultaneously operated in response to said input count signal to store said three PCM voice data samples.

6. A time shared conference arrangement as claimed in claim 5, wherein each said buffer stores twelve binary digits; eight of said binary digits representing said subscriber's voice; three of said binary digits representing network supervision information; and one of said binary digits representing parity information over said voice and supervision information.

7. A time shared conference arrangement as claimed in claim 6, said first gating means including:

said timing means being further operated to cyclically produce first and second output count signals during each time slot;

a first multiplexer connected to said fourth and to said fifth buffers and to said timing means and said first multiplexer being operated in response to a first output count signal to transmit said voice data samples of said fourth buffer or alternatively to transmit said voice data samples of said fifth buffer; and a second multiplexer connected to said fifth and said sixth buffers and to said timing means and said second multiplexer being operated in response to a second output count signal to transmit said voice data samples of said fifth buffer or alternatively to transmit said voice data samples of said sixth.

8. A time shared conference arrangement as claimed in claim 7, wherein:

in a first time slot said first multiplexer is operated to transmit said voice sample of said fifth buffer and simultaneously said second multiplexer is operated to transmit said voice sample of said sixth buffer;

in a second consecutive time slot said first multiplexer is operated to transmit said voice sample of said fourth buffer and simultaneously said second multiplexer is operated to transmit said voice sample of said sixth buffer; and in a third consecutive time slot said first multiplexer is operated to transmit said voice sample of said fourth buffer and simultaneously said second multiplexer is operated to transmit said voice sample of said fifth buffer.

9. A time shared conference arrangement as claimed in claim 7, said first comparing means including:

a first comparator connected to said first and second multiplexers for examining four least significant binary digits of said transmitted voice samples of said first and second multiplexers and for producing a resultant signal; and a second comparator connected to said first and second multiplexers and to said first comparator for examining three most significant binary digits of said transmitted voice samples of said first and second multiplexers and said second comparator being operated to combine said resultant signal with said examination of said second comparator to produce a selection signal indicating which voice sample is greater in magnitude.

10. A time shared conference arrangement as claimed in claim 9, said second comparing means including:

threshold generation means for providing a threshold level;

a third comparator connected to said threshold generation means and to said first multiplexer and being operated to produce a first greater than signal for said transmitted voice sample of said first multiplexer being greater than said threshold level; and a fourth comparator connected to said threshold generation means and to said second multiplexer means and being operated to produce a second greater than signal for said transmitted voice sample of said second multiplexer being greater than said threshold level.

11. A time shared conference arrangement as claimed in claim 10, said threshold generation means including a plurality of connections to a source of logic "1" and to a source of logic "0."

12. A time shared conference arrangement as claimed in claim 10, said second gating means including:

an inverter; and an OR-gate connected to said third and fourth comparators and to said inverter said OR-gate operated to combine said first and second greater than signals to indicate whether at least one voice sample is greater than said threshold level.

13. A time shared conference arrangement as claimed in claim 12, said third gating means including a 2 input AND-NOR gate connected to said inverter, to said OR-gate and to said second comparator and being operated in response to said selection signal of said second comparator to produce an enabling signal.

14. A time shared conference arrangement as claimed in claim 13, said memory means including:

a memory for containing the identity of a voice sample of greater magnitude of said preceding time frame;

a flip-flop connected to said memory and to said 2-input AND-OR gate and being operated to transmit said identity of greater magnitude voice sample to said 2-input AND-OR gate; and said 2-input AND-OR gate being operated in response to said transmitted identity to produce said enabling signal.

15. A time shared conference arrangement as claimed in claim 14, said multiplexing means including a third multiplexer connected to said first and second multiplexers and to said 2-input AND-OR gate and said third multiplexer being operated in response to said enabling signal to transmit said voice sample of said first multiplexer or alternatively to transmit said voice sample of said second multiplexer.

16. A time shared conference arrangement as claimed in claim 15, said multiplexing means further including:

a data selector connected to said third multiplexer;

latching means connected to said data selector; and a seventh buffer connected between said latching means and said switching network, said seventh buffer being operated in said next successive time slot to transfer said enabled voice sample to said switching network.

17. A time shared conference arrangement as claimed in claim 16, wherein there is included quiet code generation means connected to said data selector, said quiet code generation means producing quiet code for any time slots without voice samples.

18. A time shared conference arrangement as claimed in claim 17, wherein, said quiet code generation means includes a plurality of connections to logic "1."

* * * * *